July 4, 1961  N. E. NELSON ET AL  2,991,026
AIRCRAFT FLIGHT CONTROL SYSTEM
Filed June 28, 1956  5 Sheets-Sheet 1

NORMAN E. NELSON
JAMES B. REICHERT
INVENTORS.

BY
ATTORNEY.

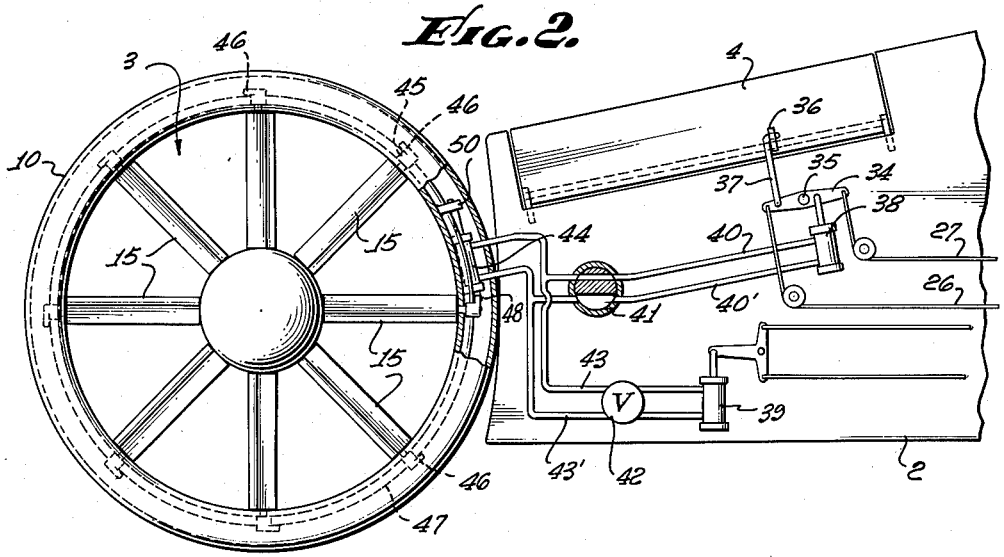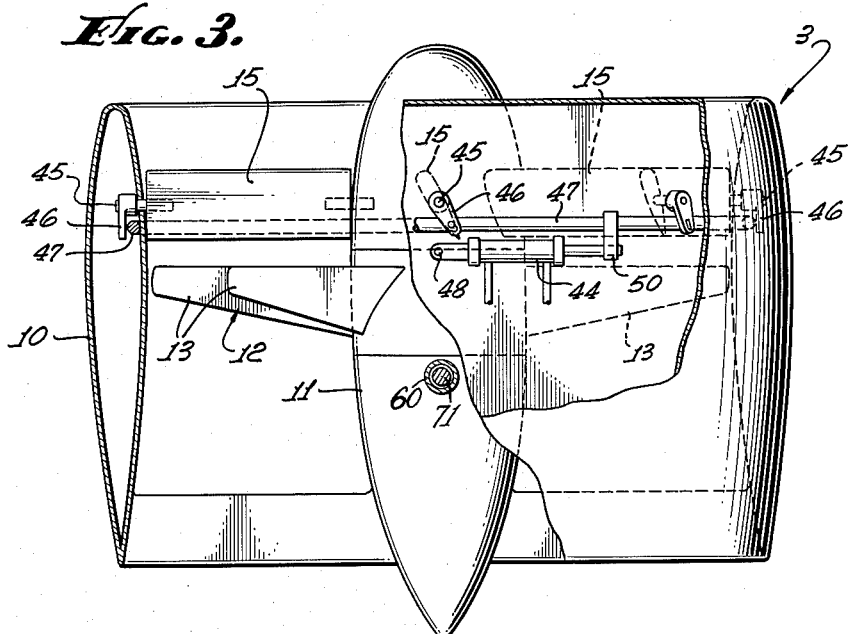

NORMAN E. NELSON
JAMES B. REICHERT
INVENTORS.

NORMAN E. NELSON
JAMES B. REICHERT
INVENTORS.

BY

ATTORNEY.

July 4, 1961
N. E. NELSON ET AL
2,991,026
AIRCRAFT FLIGHT CONTROL SYSTEM
Filed June 28, 1956
5 Sheets-Sheet 5
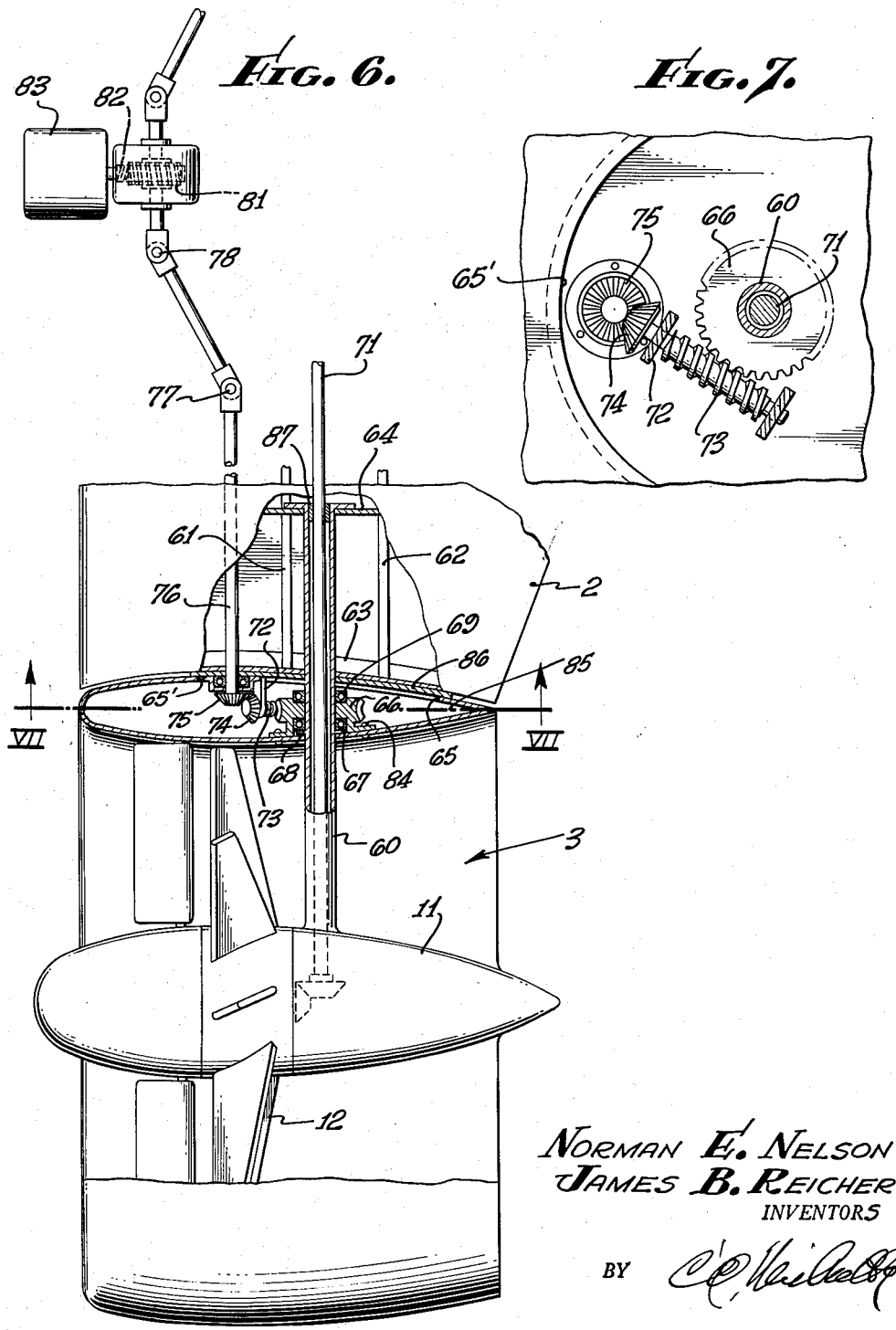
Norman E. Nelson
James B. Reichert
INVENTORS
BY
ATTORNEY.

United States Patent Office 2,991,026
Patented July 4, 1961

2,991,026
AIRCRAFT FLIGHT CONTROL SYSTEM
Norman E. Nelson and James B. Reichert, Los Angeles, Calif., assignors to Doak Aircraft Co. Inc., Torrance, Calif., a corporation of California
Filed June 28, 1956, Ser. No. 594,537
9 Claims. (Cl. 244—12)

This invention pertains to a control system for airplanes and although it is applicable to a variety of airplanes, it is of particular utility when applied to airplanes provided with a rearwardly directed engine exhaust tail pipe and to airplanes including thrust-generating propulsion units, each of said units comprising a substantially cylindrical shroud having an open inlet end and an open outlet end with driven impellers mounted for axial rotation within the resulting duct. Airplanes of the last-mentioned type have been disclosed in prior Patent No. 2,730,311 and in copending application Serial No. 472,313, filed by Edmond R. Doak and now abandoned.

As described in the copending application aforementioned, it is desirable to have an aircraft provided with means for facilitating take-off and landing on short runways and capable of substantial hovering. Such an aircraft may employ thrust-generating propulsion units, each unit comprising an open-ended shroud or tubular duct (preferably having a wall of airfoil section) and an impeller or multibladed element mounted for rotation within such duct about an axis coincidental with the axis of such duct. Such thrust-producing propulsion units may be carried by the lateral extremities of the wings and be provided with means for partially rotating each such propulsion unit about an axis lateral to the longitudinal axis of the aircraft, whereby the direction and angle of the thrust-generated by such propulsion unit may be controllably varied through a range of 90° or more. Such an arrangement permits the aircraft to become airborne and to land in a virtually vertical manner and to fly at relatively high speed after being airborne. The present invention also contemplates aircraft having a rearwardly directed engine exhaust tail pipe (generally disposed in substantially axial alignment with the body), such rearwardly directed thrust facilitating and aiding in forward progress of the aircraft.

The present invention is particularly directed to a control system for airplanes of the types disclosed hereinbefore, the present control systems being adapted to work in conjunction with the basic or conventional control systems employing the normal surfaces of an aircraft, such as rudder, elevators and ailerons. The present invention is particularly directed to a control system whereby lateral control (roll or bank about the longitudinal axis) does not depend solely upon ailerons, but instead such ailerons are supplemented by controlled variations in the thrust generated by propulsion units (when such units are so positioned as to generate a downwardly directed thrust) so as to greatly facilitate, amplify and make more certain the lateral control. This is particularly useful during vertical, hovering or low-speed flight operations, when forward velocity of the aircraft is insufficient to permit normal surfaces to perform their control functions.

Furthermore, the present invention contemplates a flight control system whereby the thrust of laterally spaced thrust producing units may be varied either in a complementary or homologous manner without change in speed of a single power plant or engine or in the pitch angle of the impellers. When in forward or horizontal flight, when being airborne or landing homologous or equal increase (or decrease) in the thrust generated by such units is sometimes required; when hovering with units directing thrust downwardly, homologous variation in thrust is highly desirable for elevational control. Complementary variation (thrust increased in one unit and decreased in the unit on the other side of the axis) is very necessary to control roll, particularly when hovering or at low forward speed.

In addition, the present invention facilitates longitudinal and directional control by means interlocked with the normal elevator and rudder controls and utilizes variably positionable vanes located in the stream of gases discharged from the tail pipe. All of these controls are associated with pilot-controlled means for controllably moving the normal control surfaces, thereby facilitating the ease of maneuverability of the aircraft.

Generally stated, therefore, the present invention is directed to a flight control system whereby roll, bank, pitch and yaw may be effectively controlled even during condition of minimal or zero movement through the air by relatively small variations in thrust forces generated by the thrust-producing units of the airplane.

An object of the present invention is to disclose and provide means for utilizing the thrust generated by propulsion units carried by an aircraft in controlling roll or bank about a longitudinal axis, yaw or angular motion about a vertical or normal axis and pitch or angular motion about a lateral axis.

Another object of the present invention is to disclose and provide a flight control system whereby the axial thrust generated by a bladed element rotatably mounted in a duct may be controllably varied without variation in the rotational velocity or pitch angle of the bladed element, the variation in axial thrust being utilized for the purpose of controlling the movement or attitude of the airplane in flight.

These and other objects and advantages of the invention will become apparent from the description of certain exemplary means and methods illustrated in the appended drawings, in which:

FIG. 2 is a somewhat diagrammatic enlarged plan view of a thrust-generating unit and an end portion of a wing of an airplane bearing such unit.

FIG. 3 is a side elevational of a portion of the thrust-generating unit shown in FIG. 2, and partly broken away, illustrating an exemplary means for controllably varying inlet guide vanes.

Figure 4A:
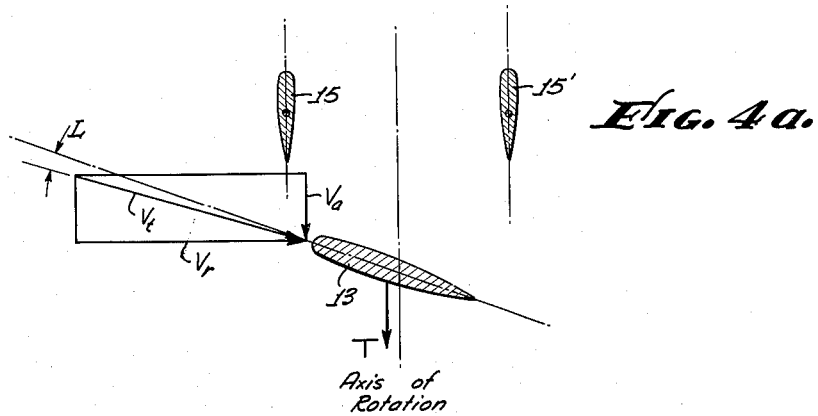
Figure 4B:
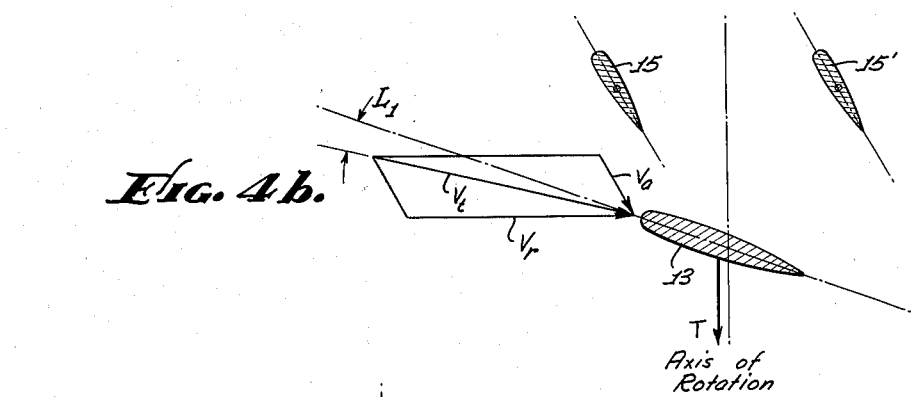
Figure 4C:
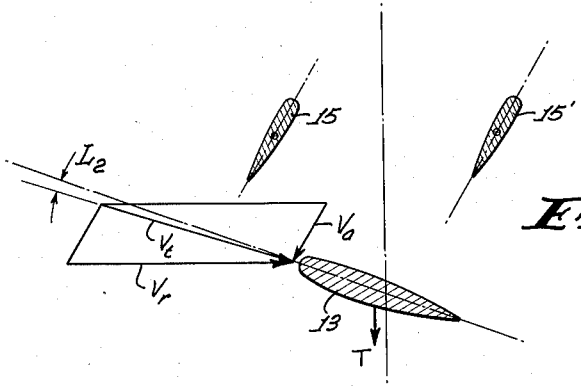

FIGS. 4a, 4b and 4c constitute diagrammatic representations indicating the effect obtained by one control system disclosed herein.

Figure 5:
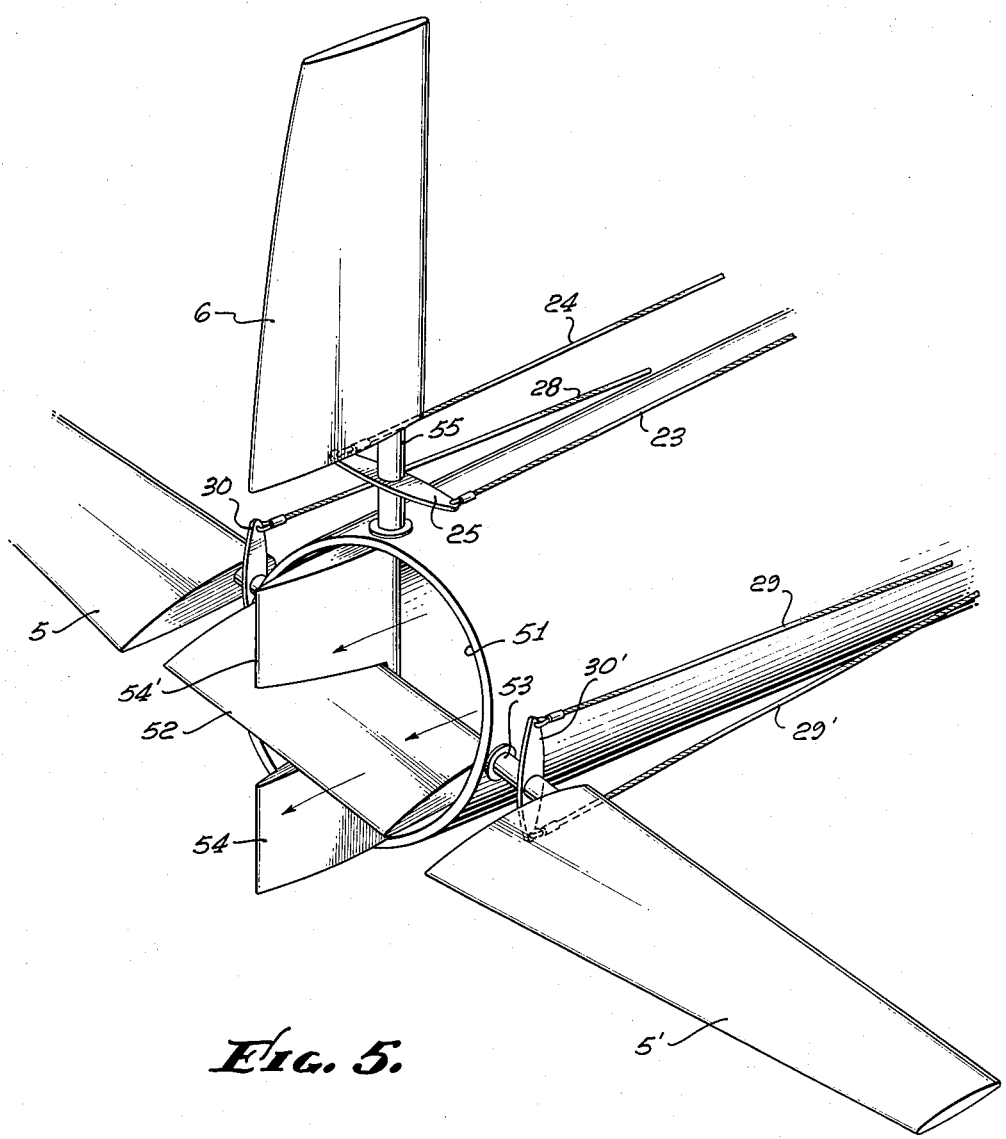

FIG. 5 is an idealized perspective view of a tail assembly embodying a control system disclosed herein.

FIG. 6 is an enlarged plan view, partly in section, of a a portion of the airplane disclosing the means for pivotally mounting the thrust-generating unit on the end portion of the wing.

FIG. 7 is a transverse section taken along the plane VII—VII in FIG. 6.

The copending application of Edmond R. Doak Serial No. 472,313, now abandoned discloses an airplane having a body and laterally disposed wings, a thrust-producing propulsion unit being carried by the lateral extremity of each of the wings. Each propulsion unit includes a thrust-generating means positioned within an open-ended duct, such thrust-generating means being generally a multibladed rotor mounted for axial rotation within the duct or shroud. A single, primary power plant or engine carried by the body of the airplane may be used in driving the multibladed elements within their respective shrouds or ducts; the exhaust from such power plant is preferably discharged rearwardly along an axis substantially coincidental with the axis of the aircraft. As disclosed in the said copending application, each of the thrust-generating means carried by the lateral extremity of each of the wings includes means for controllably and partially rotating the propulsion units about an axis transverse to the body of the aircraft, whereby the thrust-generated by such units may be directed downwardly (as during take-off or hovering) and rearwardly for rapid forward flight or at any desired angle between these two virtually extreme positions.

It will be readily appreciated that lateral control during hovering or minimal horizontal movement through the air cannot depend upon the dynamic action of the passage of air over normal control surfaces and ailerons are of but little effect. In accordance with the present invention roll or bank of the airplane is controlled under the aforesaid conditions by relatively small variations in the thrust forces which sustain the airplane in suspension above the ground. Moreover, such variations in thrust forces are preferably obtained without the necessity of varying the velocity of rotational speed of the impellers within the thrust-producing units nor by changes in the pitch angle of the blades of such units. Furthermore, the controls herein contemplated are interrelated with the normal control surfaces so that they can be readily and easily mastered by a pilot.

Figure 1:
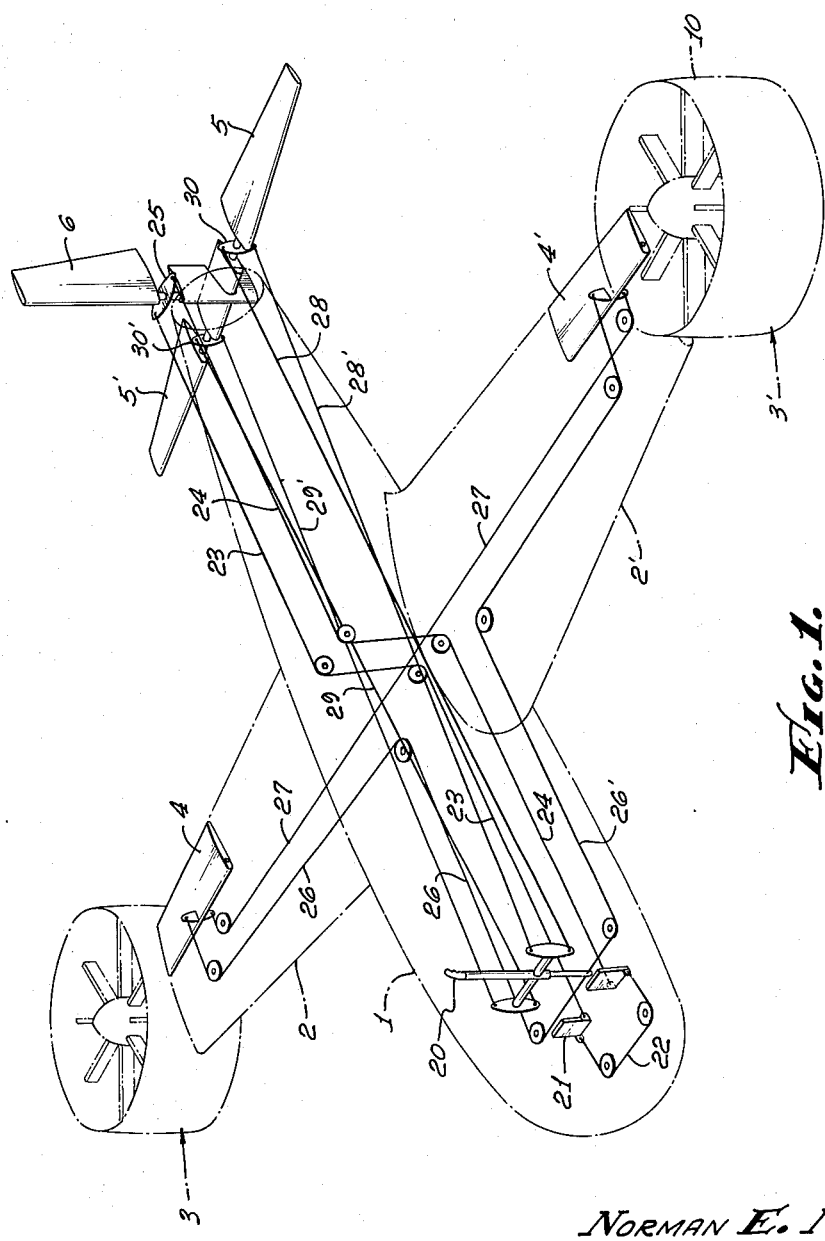
FIG. 1 is a schematic perspective representative of an airplane provided with an exemplary flight control system embraced by this invention.

FIG. 1 is a schematic representation of an airplane provided with exemplary flight control devices embraced by this invention. The body or fuselage of the airplane is generally indicated by dash lines at 1. The wings are also indicated by dash lines at 2 and 2'. Thrust-producing units 3 and 3' are shown carried by the lateral extremities of the wings 2 and 2'. Normal control surfaces such as ailerons 4 and 4', elevators 5 and 5', and a rudder 6 are also shown, these normal control surfaces being shown in full lines.

Each of the thrust-generating propulsion units, such as 3, preferably comprises a substantially cylindrical shroud 10 (the wall of such shroud being preferably of airfoil section). The shroud therefore forms an open-ended duct provided with an open inlet end and an open outlet end. Axially positioned within each shroud 10, as by means of a streamlined spider 11', is a streamlined hub 11 enclosing suitable transmission means whereby the bladed impeller 12 is driven within the shroud, the impeller rotating about an axis coincidental with the axis of the shroud. The entire propulsion unit 3 is mounted for partial rotation about an axis transverse to the body or fuselage 1 of the airplane, one means of so mounting and variably positioning the propulsion unit being described in the copending Doak application aforementioned. A plurality of radial guide vanes 15 is positioned adjacent the inlet side of the bladed element 12, the inner ends of such guide vane being pivotally mounted in the hub 11. Such vanes 15 are normally held so as to lie in planes passing through the axis of the shroud 10 or at least in planes parallel to such axis. Means for controllably and variably positioning such vanes 15 into planes at an angle to the axis of the duct or shroud shall be more fully described hereinafter.

The airplane is preferably provided with the usual controls for the normal control surfaces, such means being pilot-controlled as through the medium of a control stick 20 and rudder pedals 21. In order to simplify description, a common type of cable control is illustrated, the rudder pedals 21 being interconnected as by cable 22 and cables 23 and 24 to a rudder horn 25 adapted to variably position the rudder 6.

The control stick 20 is also shown provided with aileron cables 26 and 26' leading to ailerons 4 and 4', respectively, the two ailerons being interconnected by cable 27, whereby equal and opposite movements may be imparted to the two ailerons.

The control stick 20 is also connected as by means of cables 28 and 28', 29 and 29' to elevator horns 30 and 30', respectively, whereby the attitude of the elevators 5 and 5' may be controlled. Details of construction are not illustrated inasmuch as pilot-controlled means for adjustably positioning normal surfaces, such as ailerons, elevators and rudders, are well known in the art.

As previously indicated, when an aircraft of this type is hovering or is moving through the air at low forward speed, ailerons 4 and 4' are of very little value in controlling roll or bank. Under such conditions the propulsion units 3 and 3' are producing a downwardly directed thrust. It has been discovered that such downwardly directed thrust can be controllably varied by adjustably and controllably varying the angles of the radial inlet guide vanes 15. By referring to FIGS. 4a, 4b and 4c, the mode of operation will become apparent. In FIG. 4a a blade 13 of the impeller 12 is shown in relation to inlet guide vanes 15 and 15', such guide vanes being in planes parallel to the axis of rotation so that they have very little or no effect on the entering air. The rotational velocity of such driven impeller blade 13 is indicated by the line $V_r$. The velocity of entering air is indicated at $V_a$. The effective total velocity is therefore represented by $V_t$ and the effective angle of attack of the vane, propeller or impeller blade 13 is indicated at L. "T" represents graphically the thrust generated by such driven impeller at a given rotational velocity and pitch angle. When the inlet guide vanes 15 are placed at an angle to the axis of rotation so as to impart a swirl to the incoming air in a direction opposite to the direction of rotation of the impeller 13 (as illustrated in FIG. 4b), a greater thrust is generated, as there graphically shown. It will be remembered that $V_r$ is kept constant, but as shown in FIG. 4b, $V_t$ becomes greater and the effective angle of attack $L_1$ of the blade 13 is greater.

When the inlet guide vanes are now adjustably positioned to give a swirl to the incoming air in the same direction as the rotation of the impeller blades 13, the conditions diagramed in FIG. 4c obtain and it will be noted that the effective angle of attack $L_2$ decreases and the thrust generated by the assembly is reduced.

In accordance with the present invention, therefore, means are provided whereby the radial or guide vanes positioned adjacent the inlet side of the driven impellers of each thrust-producing unit can be controlled so as to variably position such vanes in planes at an angle to the axis of the duct. Moreover, such means are preferably interconnected to the normal controls so that they can be energized and actuated by the pilot.

By referring to FIG. 2, the aileron 4 is capable of manual operation by means of cables 26 and 27 which may be connected to a horn 34 mounted to oscillate upon a pivot 35 and connected to an aileron-actuating arm 36 by means of a link 37. The horn 34 may also be connected to the piston of a hydraulic cylinder 38, opposite ends of this cylinder being connected by lines 40 and 40' to opposite ends of hydraulic actuating cylinder 44, a valve 41 (preferably electrically operated) being interposed in lines 40 and 40'. As best shown in FIGS. 2 and 3, each of the radial guide vanes 15 may be provided with trunnions or pivot pins 45, the outer pivot pins being provided with a crank arm 46 operably connected to an actuator ring 47 interconnecting all of the guide vanes 15. The servo mechanism or actuating cylinder 44 is mounted to and within the cylindrical shroud 10, as for example, at 48, and its operating piston 49 is connected to the actuator ring 47, as for example, at 50.

It is to be understood that the manual, pilot-controlled means, such as the cables 27 and 26, initiate movement of the aileron and immediately operate the hydraulic cylinder 38, causing such cylinder to supply fluid pressure to mechanism for correspondingly varying the angular position of vanes 15 to obtain (by varying thrust of the unit) that effect which cannot be obtained by aileron manipulation alone. Cylinder 38, lines 40 and 40' and cylinder 44 constitute a closed system in the illustrated example when valve 41 is in the open position shown.

It will therefore be evident that when the aircraft is hovering and valve 41 is open, operation of the control stick 20 in such manner as to vary the position of the ailerons 4 and 4' will automatically energize the hydraulic mechanisms and cause a suitable controllable and variable but complementary change in the position of the inlet guide vanes 15, thus causing the laterally spaced thrust-generating units on opposite sides of the longitudinal axis to produce a complementary thrust designed to maintain the airplane in a level position. When aileron 4 is raised, thrust of unit 3 is reduced and concurrently 4' is lowered and thrust of 3' is increased. Roll or banks of the aircraft about the longitudinal axis is therefore under complete control of the pilot, even though the flow of air over the ailerons would be normally insufficient to permit such lateral control.

It will be evident that when the aircraft is provided with a single, centrally located power plant driving such laterally spaced thrust generating units it would be virtually impossible to vary the rotational speed in the units in a complementary manner, whereas complementary thrust variation is readily obtained by this invention.

It will be evident to those skilled in the art that although the specific example illustrated has referred to fluid pressure actuated mechanisms, electrically operated mechanisms can be similarly employed. Moreover, although the controls here illustrated have been applied to but two laterally displaced, thrust-generating units, the airplane may be provided with four or even more thrust-generating units whose output may be similarly varied. Moreover, although thrust is preferably varied by adjustably positioning radial vanes in the inlet portion of a substantially cylindrical thrust-generating and propulsion unit, similar radial blades or vanes may be positioned adjacent the outlet side of a bladed impeller in such unit and by variably positioning such blades on the outlet side or portion, a somewhat similar effect, varying the effective output can be obtained, although not as effectively or economically.

Ordinarily, when two thrust-generating units are carried by an aircraft laterally displaced on opposite sides of the longitudinal axis, it is desirable to increase the thrust produced by one of such units and reduce the thrust produced by the other. Under certain conditions, however, it may be desirable to simultaneously increase or decrease the thrust generated by both units in order to obtain elevational control during hovering, for example. Variation in motor speed or pitch angles of impellers are not satisfactory. Homologous change in thrust (both laterally spaced units simultaneously increasing their thrust equally, for example) can be readily obtained by providing branch lines 43 and 43' which bypass valve 41 and connect actuating cylinder 44 with a hydraulic cylinder 39. A suitable cutoff valve 42 may be interposed in lines 43 and 43'. The piston of cylinder 39 is operated by pilot controlled means (as by the horn and cables illustrated) so that similar and equal (homologous) motion is imparted to each piston in each cylinder 39 associated with each actuating cylinder 44, to obtain homologous change in thrust of each thrust-generating unit.

During rapid forward flight valve 41 can be closed (as by rotating 90° from the position illustrated in FIG. 2) and in such position opposite ends of cylinder 38 are interconnected through the valve, permitting ailerons to be operated in the normal manner without simultaneous variation in angulation of vanes. Under such conditions, cylinder 39 can be used to produce homologous changes in thrust when valve 42 is open, or vanes can be locked in a desired angle by closing valve 42.

Means are provided for imparting rotation to the multibladed fan within each of the propulsion units and for imparting controllable partial rotation to such units for the purpose of varying the attitude thereof with respect to the longitudinal axis of the airplane. Various means may be employed for imparting simultaneous partial rotation to the propulsion units and FIGS. 6 and 7 are illustrative of one arrangement of elements which may be employed for accomplishing such rotation. As indicated in FIG. 6, a stationary tubular trunnion shaft 60 is firmly mounted with respect to the wing 2 and extends outwardly therefrom beyond the tip thereof and into the stationary portion of the fan hub unit 11. For purposes of illustration, only the wing 2 is shown provided with a front spar or wing beam 61, a rear spar 62 and ribs such as 63 and 64. These spars and ribs are simply illustrative of methods employed in wing construction. The hollow trunnion shaft 60 may be attached to a face of the front spar 61 in any suitable manner and to the ribs 63 and 64. The external surface of the propulsion unit 3 may be provided with a circular aperture (defined by the edges 65 and 65') surrounding the hollow trunnion shaft 60 but spaced therefrom. Within the wall of the shroud of the propulsion unit 3 there is firmly mounted a worm wheel 66, the trunnion shaft 60 extending therethrough. Suitable radial and thrust bearings 67 are carried between the trunnion shaft 60 and the hub of the worm wheel 66, a stop ring 68 being carried by the trunnion shaft so as to prevent axial displacement of the propulsion unit with respect to the trunnion shaft. Additional bearings such as 69 may be employed for the purpose of resisting other axial or normal thrust forces.

Extending through the hollow trunnion shaft 60 is a fan drive shaft 71, such fan drive shaft being operatively connected to a suitable main power plant located within the fuselage for transmitting rotation to the shaft and the hub upon which the blades 12 are mounted. It should be understood that a complementary drive shaft extends from the main power plant (not shown) to the other propulsion units 3' located on the other side of the longitudinal axis of the aircraft. The single power plant (any type of engine or geared combination of engines may be used) therefore provides driving forces for both of the multibladed fans located in the tubular ducts of the propulsion units.

Means are provided for controllably and partially rotating the propulsion units about the lateral axis of the aircraft. Extending outwardly from the terminal rib 63 is a suitable bracket 72 in which a worm 73 is journaled, this worm being in engagement with the worm wheel 66. The end of the worm shaft also carries a bevel gear 74 in engagement with the bevel gear 75 carried by the end of a rotational drive shaft 76 suitably journaled in bearings carried by the ribs of the wing, such rotational drive shaft 76 extending into the body of the airplane. Universal joints such as 77 and 78 may be employed to impart proper flexibility to the drive shaft. The drive shaft 76 carries a worm gear 81 in engagement with a worm 82 driven by a drive motor 83. It will be evident that whenever the motor 83 is driven, it will cause rotation of drive shaft 76, rotation of such drive shaft being transmitted by beveled gears 74 and 75 to worm 73 and worm wheel 66. Since the latter is firmly connected to the shroud of the propulsion unit 3 (by any suitable means such as rivets 84) the entire propulsion unit will be rotated upon the trunnion shaft 60. In may be noted at this time that the contour of the wing tip 2 is preferably of a configuration 85 approximating the curvature of the outer surface of the shroud so that when the propulsion units 3 are forwardly directed, very little space exists between the wing tip and the propulsion unit carried thereby. The circular opening (having the margins 65, 65') formed in the external surface of the propulsion unit is normally closed by means of a circular plate 86 carried by the wing tip, sliding contact being made between such closure plate and the movable propulsion unit. It is to be understood that suitable bearings such as 87 are used between the trunnion shaft 60 and the fan drive shaft 71 as well as at spaced points along such drive shaft. In some instances, the hollow tubular trunnion shaft 60 may constitute an element of the main wing spar.

The present invention also contemplates an interlock between the normal pilot-operated control surfaces used for controlling yaw and pitch and means utilizing the axial thrust of a tail pipe. The tail pipe may discharge gases from the primary power plant or engine used for driving the impellers in the units 3 and 3'. A rearwardly directed exhaust tail pipe 51 is shown in FIG. 5 below the rudder 6 and between elevators 5 and 5'. In this idealized representation, the elevators 5 and 5' are shown controlled by horns 30 and 30' and the cables previously described, whereas the rudder 6 is controlled by horn 25 and cables 23 and 24. It is to be understood that other methods and means for adjustably positioning and moving the elevators and rudder are contemplated.

The tail pipe 51 is provided with at least two pivotally mounted vanes in the trailing edge portion and in the path of gases being rearwardly discharged by such tail pipe 51. In the illustration, one of said vanes 52 is mounted for pivotal movement about a horizontal axis indicated by the shaft 53; another vane shown as furcated and including portions 54, 54' is pivotally mounted for movement about a vertical axis indicated by the shaft 55, by means of which the rudder 6 is moved. In this simplified version, vane portions 54 and 54' are mounted upon the same shaft as the rudder 6 and therefore in response to the pilot-control means or stick 20, the rudder as well as vanes 54–54' are simultaneously moved, thereby utilizing and translating the normally axial thrust of the gases discharged from the tail pipe 51 into an angularly directed thrust for facilitating yaw or angular motion of the airplane about a vertical axis. Similarly, pitch or angular motion about a lateral axis is controlled not only by the elevators 5 and 5' but also by the utilization of the normally axial thrust of the gases discharged from the tail pipe, such gases being now directed angularly by impingement upon the adjustably movable vane 52.

It is to be understood a hydraulic mechanism or booster such as has been described heretofore in connection with the movement of ailerons and inlet guide vanes on the thrust-producing units may be employed in expediting and facilitating movement of the vanes 52 and 54 as well as of the normal control surfaces such as elevators and rudders.

We claim:

1. In an aircraft, including a wing, normal control surfaces comprising elevator, rudder and ailerons, pilot-controlled means for controllably moving said normal control surfaces, and a rearwardly directed engine exhaust tail pipe, the provision of a flight control system comprising: a thrust-generating propulsion unit on each side of the longitudinal axis of the aircraft and spaced from said axis, each of said units comprising a cylindrical shroud having an open inlet end and an open outlet end, driven impellers mounted for axial rotation therein and a plurality of radially extending, pivotally mounted vanes in the inlet portion of such unit, each of said units being mounted for controllable movement about a lateral axis whereby said units may be adjusted to direct thrust at any desired angle between horizontal and vertical, and means energized by said pilot-controlled means for attaining lateral control of the aircraft by simultaneously and controllably varying the position of ailerons and of said pivoted vanes in the propulsion units.

2. An aircraft as stated in claim 1 wherein the last-named means include a mechanism energized by pilot-controlled means, said mechanism varying the position of the pivoted vanes in the propulsion unit.

3. An aircraft flight control system as stated in claim 1 wherein each thrust-generating propulsion unit includes a vane moving device adapted to be energized by said pilot-controlled means when the latter has initiated movement of ailerons.

4. An aircraft flight control system as stated in claim 1, wherein the means energized by said pilot-controlled means include an actuator ring operably interconnecting said pivotally mounted vanes on each thrust-generating propulsion unit, and a mechanism for controllably moving said actuator ring.

5. In an aircraft including an aileron and a thrust propulsion unit on each side of the longitudinal axis of the aircraft, each of said units comprising a cylindrical shroud having an open inlet end and an open outlet end and driven impellers mounted for axial rotation therein, the provision of: means mounting each of said units for controllable movement about a lateral axis of the aircraft; a plurality of radially extending, pivotally mounted vanes in the inlet portion of each unit; and means for controllably moving vanes in each of said units.

6. An aircraft as stated in claim 5 including selectively operable means for simultaneously varying the position of the vanes and ailerons on both sides of the aircraft, the variation in position of vanes in one unit being complementary to the position of vanes in the other unit.

7. An aircraft as stated in claim 5 wherein the means for controllably moving the vanes are selectively operable to move the vanes of one unit into position homologous to the position of vanes in the other unit.

8. An aircraft as stated in claim 5 wherein said means for controllably moving the vanes, comprise fluid pressure means, and means for interconnecting said fluid pressure means with pilot-controlled aileron moving means.

9. A flight control system for an aircraft including a thrust generating unit on each side of the longitudinal axis of the aircraft, each of said units having a thrust axis comprising: means for adjustably positioning said units about a lateral axis, and means including radially extending pivotally mounted vanes in each of said units for controllably varying the thrust generated by said units, said vanes being non-rotatable around the thrust axis of each unit.

References Cited in the file of this patent

UNITED STATES PATENTS

| | | |
|---|---|---|
| 1,723,479 | Goodrich | Aug. 6, 1929 |
| 2,118,052 | Odor | May 24, 1938 |
| 2,395,809 | Goddard | Mar. 5, 1946 |
| 2,450,821 | Zimmerman | Oct. 5, 1948 |
| 2,478,847 | Stuart | Aug. 9, 1949 |
| 2,702,168 | Platt | Feb. 15, 1955 |
| 2,762,584 | Price | Sept. 11, 1956 |
| 2,780,424 | Price | Feb. 5, 1957 |

FOREIGN PATENTS

| | | |
|---|---|---|
| 983,334 | France | Feb. 7, 1951 |